(12) United States Patent
Conlon

(10) Patent No.: US 11,674,439 B2
(45) Date of Patent: *Jun. 13, 2023

(54) HIGH PRESSURE LIQUID AIR POWER AND STORAGE

(71) Applicant: PINTAIL POWER LLC, Palo Alto, CA (US)

(72) Inventor: William M. Conlon, Palo Alto, CA (US)

(73) Assignee: Pintail Power LLC, Palo Alto, CA (US)

(*) Notice: Subject to any disclaimer, the term of this patent is extended or adjusted under 35 U.S.C. 154(b) by 22 days.

This patent is subject to a terminal disclaimer.

(21) Appl. No.: 17/385,146

(22) Filed: Jul. 26, 2021

(65) Prior Publication Data

US 2021/0348558 A1 Nov. 11, 2021

Related U.S. Application Data

(63) Continuation of application No. 15/953,167, filed on Apr. 13, 2018, now Pat. No. 11,073,080, which is a (Continued)

(51) Int. Cl.
*F02C 6/00* (2006.01)
*F02C 6/16* (2006.01)
(Continued)

(52) U.S. Cl.
CPC .............. *F02C 6/16* (2013.01); *F01K 23/10* (2013.01); *F01K 23/18* (2013.01); *F01K 25/10* (2013.01);
(Continued)

(58) Field of Classification Search
CPC .... F25J 1/0012; F25J 2240/10; F25J 2230/40; F02C 6/16
See application file for complete search history.

(56) References Cited

U.S. PATENT DOCUMENTS 3,693,347 A 9/1972 Kydd et al.
4,329,842 A 5/1982 Hoskinson
(Continued)

FOREIGN PATENT DOCUMENTS

DE 102009022491 A1 1/2011
EP 2503111 A1 9/2012
(Continued)

OTHER PUBLICATIONS

Supplementary European Search Report, EP1487752, dated Jun. 23, 2017, 1 page.
(Continued)

*Primary Examiner* — Brian M King
(74) *Attorney, Agent, or Firm* — Schmidt Patent Law, Inc.

(57) ABSTRACT

Apparatus, systems, and methods store energy by liquefying a gas such as air, for example, and then recover the energy by regasifying the liquid and combusting or otherwise reacting the gas with a fuel to drive a heat engine. The process of liquefying the gas may be powered with electric power from the grid, for example, and the heat engine may be used to generate electricity. Hence, in effect these apparatus, systems, and methods may provide for storing electric power from the grid and then subsequently delivering it back to the grid.

20 Claims, 11 Drawing Sheets

Related U.S. Application Data continuation of application No. PCT/US2016/054152, filed on Sep. 28, 2016.

(60) Provisional application No. 62/379,970, filed on Aug. 26, 2016, provisional application No. 62/364,781, filed on Jul. 20, 2016, provisional application No. 62/357,216, filed on Jun. 30, 2016, provisional application No. 62/244,407, filed on Oct. 21, 2015, provisional application No. 62/244,648, filed on Oct. 21, 2015.

(51) Int. Cl.
*F02C 7/08* (2006.01)
*F01K 23/18* (2006.01)
*F01K 23/10* (2006.01)
*F01K 25/10* (2006.01)

(52) U.S. Cl.
CPC ............ *F02C 7/08* (2013.01); *F05D 2220/32* (2013.01); *F05D 2220/60* (2013.01); *F05D 2220/72* (2013.01); *Y02E 20/16* (2013.01); *Y02E 60/16* (2013.01)

(56) References Cited

U.S. PATENT DOCUMENTS

| | | |
|---|---|---|
| 4,760,705 A | 8/1988 | Yogev et al. |
| 5,412,938 A | 5/1995 | Keller |
| 5,457,951 A | 10/1995 | Johnson et al. |
| 6,065,280 A | 5/2000 | Ranasinghe et al. |
| 6,571,548 B1 | 6/2003 | Bronicki et al. |
| 6,920,759 B2 | 7/2005 | Wakana et al. |
| 7,406,829 B2 | 8/2008 | Coffinberry |
| 7,478,524 B2 | 1/2009 | Kreitmeier |
| 7,770,376 B1 | 8/2010 | Brostmeyer |
| 7,821,158 B2 | 10/2010 | Vandor |
| 7,870,746 B2 | 1/2011 | Vandor |
| 7,870,747 B1 | 1/2011 | Brown |
| 8,020,404 B2 | 9/2011 | Vandor |
| 8,036,351 B2 | 11/2011 | Vandor |
| 8,063,511 B2 | 11/2011 | Vandor |
| 8,329,345 B2 | 12/2012 | Koda et al. |
| 8,907,524 B2 | 12/2014 | Vandor |
| 9,410,481 B2 | 8/2016 | Palmer et al. |
| 2001/0004830 A1* | 6/2001 | Wakana ............... F25J 1/0228 60/39.182 |
| 2001/0015060 A1 | 8/2001 | Bronicki et al. |
| 2001/0039797 A1 | 11/2001 | Cheng |
| 2003/0005698 A1 | 1/2003 | Keller |
| 2003/0101728 A1 | 6/2003 | Wakana et al. |
| 2005/0126176 A1 | 6/2005 | Fletcher et al. |
| 2005/0132746 A1 | 6/2005 | Brugerolle et al. |
| 2005/0223712 A1 | 10/2005 | Briesch et al. |
| 2008/0011161 A1 | 1/2008 | Finkenrath et al. |
| 2008/0163618 A1 | 7/2008 | Paul |
| 2008/0302133 A1 | 12/2008 | Saysset et al. |
| 2009/0071172 A1 | 3/2009 | VandenBussche et al. |
| 2009/0158739 A1 | 6/2009 | Messmer |
| 2009/0205364 A1 | 8/2009 | Enis et al. |
| 2009/0293503 A1 | 12/2009 | Vandor |
| 2009/0320828 A1 | 12/2009 | Koketsu et al. |
| 2011/0072819 A1 | 3/2011 | Silva et al. |
| 2011/0126549 A1 | 6/2011 | Pronske et al. |
| 2011/0132032 A1 | 6/2011 | Gatti et al. |
| 2011/0226010 A1 | 9/2011 | Baxter |
| 2011/0232545 A1 | 9/2011 | Clements |
| 2012/0023947 A1 | 2/2012 | Kulkarni et al. |
| 2013/0312386 A1 | 11/2013 | Wirsum et al. |
| 2013/0318969 A1 | 12/2013 | Zhou et al. |
| 2014/0202157 A1 | 7/2014 | Shinnar et al. |
| 2014/0223906 A1 | 8/2014 | Gee et al. |
| 2015/0184590 A1 | 7/2015 | Conlon |
| 2015/0184593 A1 | 7/2015 | Kraft et al. |
| 2015/0218968 A1 | 8/2015 | Sinatov et al. |
| 2015/0236527 A1 | 8/2015 | Goldman |
| 2015/0240654 A1 | 8/2015 | Goldman |
| 2015/0263523 A1 | 9/2015 | Goldman |
| 2018/0080379 A1 | 3/2018 | Conlon |
| 2018/0094550 A1 | 4/2018 | Conlon |
| 2018/0100695 A1 | 4/2018 | Conlon |

FOREIGN PATENT DOCUMENTS

| | | |
|---|---|---|
| EP | 2610470 A2 | 7/2013 |
| EP | 2634383 A1 | 9/2013 |
| JP | 04127850 A | 4/1992 |
| JP | 2000337170 A | 12/2000 |
| WO | 2007/096656 A1 | 8/2007 |
| WO | 2011/000548 A1 | 1/2011 |
| WO | 2011/071609 A1 | 6/2011 |
| WO | 2013/116185 A1 | 8/2013 |
| WO | 2014/055307 A1 | 4/2014 |
| WO | 2015/105670 A1 | 7/2015 |
| WO | 2016/195968 A1 | 12/2016 |
| WO | 2017/069922 A1 | 4/2017 |
| WO | 2017/079617 A1 | 5/2017 |

OTHER PUBLICATIONS

Gail Reitenbach, Ph.D., "The Carbon Capture and Storage R&D Frontier", http://www.powermag.com, May 1, 2015, 12 pages.
International Search Report corresponding to PCT/US2014/071561, dated Apr. 20, 2015, 2 pages.
Brian Stover, et al., "Liquid Air Energy Storage (LAES) Development Status and Benchmarking with other Storage Technologies", Power-Gen Europe 2014, Jun. 3-5, 2014, Cologne, 15 pages.
Brian Stover, et al., "Process Engineering and Thermodynamic Evaluation of Concepts for Liquid Air Energy Storage", Power-Gen Europe 2013, Jun. 4-6, 2013, Vienna, 15 pages.
Yongliang Li, et al., "An integrated system for thermal power generation, electrical energy storage and CO2 capture", Int. J. Energy Res. 2011; 35:1158-1167.
Centre for Low Carbon Futures 2050, "Liquid Air in the energy and transport systems Opportunities for industry and innovation in the UK, Summary Report and Recommendations", May 9, 2013, ISBN: 978-0-9575872-1-2, 32 pages.
Sylvain Quoilin et al., "Techno-economic survey of Organic Rankine Cycle (ORC) Systems", Renewable and Sustainable Energy Reviews 22 (2013) pp. 168-186.
Vankeirsbilck et al., Organic Rankine Cycle as Efficient Alternative to Steam Cycle for Small Scale Power Generation, Jul. 2011, 8th International conference on Heat Transfer, Fluid Mechanics, and Thermodynamics in Point AUx Piments, Mauritius, HEFAT2011, p. 785-792.
Z.S. Spakovsky, Unified: Thermodynamics and Propulsion Notes: (I) First Law of Thermodynamics (3) First Law Applied to Engineering Cycles (3.7) Brayton Cycle (3.7.1) Brayton Cycle Efficiency, Oct. 2011, MIT, Version 6.2.
B.E. Enga and W.T. Thompson, Catalytic Combustion Applied to Gas Turbine Technology: High Temperature use for Metal Supported Platinum Catalysts, 1979, Platinum Metals Review, 23, (4), p. 134-141.
International Search Report corresponding to PCT/US2016/032342, dated Jul. 11, 2016, 1 page.
International Search Report corresponding to PCT/US2016/032890, dated Jul. 22, 2016, 1 page.
International Search Report corresponding to PCT/US2016/032363, dated Sep. 12, 2016, 1 page.
International Search Report corresponding to PCT/US2016/060608, dated Jan. 16, 2017, 1 page.
International Search Report corresponding to PCT/US2017/067360, dated Feb. 21, 2018, 1 page.
International Search Report corresponding to PCT/US2016/054152, dated Feb. 7, 2017, 1 page.
Jinwoo Park et al., A Novel Design of Liquefied Natural Gas (LNG) Regasification Power Plant Integrated with Cryogenic Energy Storage System, Ind. Eng. Chem. Res. 2017, 56, pp.

(56) References Cited

OTHER PUBLICATIONS

Supplementary European Search Report, EP16857980, dated May 24, 2019, 1 page.

* cited by examiner

HIGH PRESSURE LIQUID AIR POWER AND STORAGE

CROSS REFERENCE TO RELATED APPLICATIONS

This application is a continuation of U.S. patent application Ser. No. 15/953,167 filed Apr. 13, 2018, which is a continuation of International Patent Application PCT/US2016/054152 filed Sep. 28, 2016. PCT/US2016/054152 claims benefit of priority to U.S. Provisional Patent Application No. 62/244,407 filed Oct. 21, 2015; U.S. Provisional Patent Application No. 62/244,648 filed Oct. 21, 2015; U.S. Provisional Patent Application No. 62/357,216 filed Jun. 30, 2016; U.S. Provisional Patent Application No. 62/364,781 filed Jul. 20, 2016; and U.S. Provisional Patent Application No. 62/379,970 filed Aug. 26, 2016. Each of the applications listed in this paragraph is incorporated herein by reference in its entirety.

This application is related to U.S. patent application Ser. No. 14/546,406 titled "Liquid Air Power and Storage" and filed Nov. 18, 2014, which is incorporated herein by reference in its entirety.

FIELD OF THE INVENTION

The invention relates generally to storing energy by liquefying air or another gas or gaseous mixture, and subsequently recovering stored energy upon regasifying the liquid.

BACKGROUND

The electric power system comprises generation, transmission, and distribution assets, which deliver power to loads. With the introduction of renewable resources, the electric power system faces a number of constraints which favor the addition of storage assets.

The principal constraint on an interconnected grid is the need to maintain the frequency and voltage by balancing variations in generation and demand (load). Failure to maintain the voltage or frequency within specifications causes protective relays to trip in order to protect generators, transmission and distribution assets from damage. Because of the interconnected dynamic electrical grid, under/over-frequency or under/over-voltage trips can cause a cascade of other trips, potentially leading to widespread blackouts.

Traditionally, electric utilities or the independent system operators managing electrical grids maintain a power generation reserve margin that can respond to changes in load or the loss of a generating unit or transmission line serving the load. These reserves are managed and scheduled using various planning methods, including day-ahead forecasts, dispatch queues that may be ordered based on generation cost, and generation ramp-rates, transmission constraints, outages, etc. The spinning generation units, that is, those that are operating, then respond to generation load control signals.

Many renewable resources are intermittent in nature, including wind farms, central station solar thermal or solar photovoltaic (PV) plants, and distributed photovoltaic systems including those on rooftops. These can produce power only when the resource is available, during daylight for solar, and when the wind is blowing for wind, leading to seasonal and diurnal production variations, as well as short-term fluctuations due to calms, gusts, and clouds. Gusts that exceed wind turbine ratings may cause them to trip with a sudden loss of full generation capacity. Deployment of these renewable systems as both central and distributed generating resources results in fluctuations in both the generation of power to be transmitted and the demand for power, since the distributed PV offsets load.

Base load is usually provided by large central station nuclear, hydroelectric or thermal power plants, including coal-fired steam plants (Rankine cycle) or gas-fired Combined Cycle Combustion Turbine plants (open Brayton air cycle with closed Rankine steam bottoming cycle). Baseload units often have operating constraints on their ramp rates (Megawatts per minute) and Turn-Down (minimum Megawatts), and startup from cold steel to rated load requires several hours to several days depending on the type and size of generating asset. Accordingly, a different class of load following power plants is also deployed in the electric power system, to complement the base load units. Generally, these load following units are less efficient in converting thermal energy to electrical energy.

This conversion efficiency is often expressed as a Heat Rate with units of thermal energy needed to produce a kilowatt-hour (kw-hr) of electricity [British Thermal Unit (BTU) per kw-hr in the U.S., kiloJoules (kJ) per kw-hr elsewhere]. The thermal equivalent of work is 3413 BTU/kw-hr or 3600 kJ/kw-hr, which represents 100% efficiency. Modern combined cycle power plants at full load rated conditions may have heat rates as low, for example, as 6000 kJ/kw-hr. Modern gas turbine peaking plants (e.g., General Electric LM6000-PC SPRINT) can achieve a full load rated condition heat rate of 9667 kJ/kw-hr based on Higher Heating Value (HHV). It is important to note that gas turbine heat rates increase rapidly away from rating conditions, and at part load in hot conditions the actual heat rate may be twice the rated Heat Rate.

It is of course desired to deliver electricity to customers at the lowest possible cost. This cost includes the amortization and profit on invested capital, the operating and maintenance (O&M) expense, and the cost of fuel. The capital amortization (and return on capital, in the case of regulated generators) is applied to the capacity factor (fraction of rated generation) to arrive at the price ($ per Megawatt-hour) associated with the fixed capital expense. The Heat Rate multiplied by the fuel cost determines the contribution of the variable fuel consumption to the electricity price. The O&M expenses generally have some combination of fixed and variable expenses, but are insignificant compared to capital and fuel for central station plants. Generating units have different mixes of fixed and variable expenses, but presumably were believed to be economic at the time they were ordered.

In order to deliver low cost electricity to a customer, it is necessary to operate the capital intensive units at high capacity, subject to fuel cost, in order to spread the capital cost across many kw-hr. Contrariwise, it is necessary to minimize the operation of units with high marginal operating cost (due to high Heat Rate, Fuel Cost or O&M). This was indeed the planning assumption for procurement of the existing fleet of generators.

The Renewable resources gather 'free' fuel, so their cost of generation is dominated by the amortization of the capital needed to gather and convert this energy into electricity. In order to profitably build and operate a Renewable power plant, it should have as high a capacity factor as may be practically realized. Similarly, the fuel-efficient base load generation should operate at high capacity factor, both to amortize the capital expense, and because its operating characteristics induce higher fuel or O&M costs (per unit of generation) when operated intermittently or at part load.

The increasing penetration of renewable generation with variable generation characteristics is challenging the traditional dispatch order and cost structure of the electric generation system. In practice, utility scale solar power plants without storage are limited to Capacity Factors of about 25%, and wind farms seldom exceed 50%. This capacity may not coincide with demand, and may be suddenly unavailable if the sun or wind resource is reduced by local weather. For example, if wind resources are available at periods of low demand, base load units must either ramp down or shut-down or the wind resource must be curtailed. If the wind is not curtailed, then less efficient peaking units may be needed to provide ramp flexibility that the large base-load units cannot provide in case of gusts or calms. Likewise the widespread deployment of solar power generation is depressing the need for generation during daylight hours, but large ramp rates as the sun rises and sets can currently only be met by gas fired peaking plants. Ironically, this will result in displacement of low-cost, high efficiency base-load units in favor of high cost, low-efficiency peaking units, with a concomitant increase in greenhouse gas releases.

For environmental, energy security, cost certainty and other reasons, renewable energy sources are preferred over conventional sources. Demand Response techniques, which attempt to reduce the instantaneous load demand to achieve balance between generation and consumption, are analogous to a peaking generation unit. Another approach is deployment of (e.g., large scale) energy storage systems to mediate the mismatch between generation and consumption.

Storage systems are alternately charged to store energy (e.g., using electric power), and discharged to return the energy as power to the electric grid. The technical characteristics of energy storage systems include:

the Capacity, or quantity of energy that can be stored and returned, measured in MW-hours;

the Round Trip Efficiency (RTE), or fraction of the energy delivered to the storage system that is returned to the grid;

the Power rating, or rate in MW at which the system can be charged or discharged (Power is often symmetric, though this is not necessary, or even desirable);

the Heat Rate, or heat added (from fuel for example) per unit of electric energy discharged, measured in kJ per KWh (purely electric storage would have a Heat Rate of zero);

the Lifetime, which is typically the number of Charge/Discharge cycles.

Pumped Storage Hydroelectricity (PSH) employs a reversible pump-turbine with two water reservoirs at different elevations. When excess energy is available, it is used to pump water from a lower to an upper reservoir, converting the electricity into potential energy. When electricity is needed, the water flows back to the lower reservoir through a hydro-turbine-generator to convert the gravitational potential energy into electricity. Pumped hydro storage is suitable for grid scale storage and has been used for many decades in electrical grids around the world. PSH has a Round Trip Efficiency (RTE) of 70% to 80% and can be deployed at Gigawatt scale with many days of potential storage. In addition to high RTE, PSH does not generate greenhouse gases during operation. Deployment of PSH requires availability of suitable locations for the construction of dams and reservoirs, and availability of water and its evaporative loss may be an issue in some locations.

Compressed Air Energy Storage (CAES) stores pressurized air that is subsequently expanded in an engine. Commercially deployed CAES stores the air in large underground caverns such as naturally occurring or solution-mined salt domes, where the weight of overburden is sufficient to contain the high pressures. The RTE for CAES may be relatively low. The 110 MW McIntosh CAES plant in the US state of Alabama reportedly has a RTE of only 27%, for example. Advanced CAES systems reportedly achieve Electric Energy Ratios of 70% or more, exclusive of fuel, and several near-isothermal CAES technologies are also under development with reported RTE of 50% or greater, using pressure vessels for storage.

Many energy storage technologies are being developed and deployed for end-use loads or distribution level capacities, at power levels from a few kilowatts to several megawatts. These approaches typically employ batteries with a variety of chemistries and physical arrangements.

There is a need for high efficiency energy storage that is not dependent on geological formations, and which can be deployed at scales of tens to hundreds of megawatts to complement the existing generation and transmission assets.

SUMMARY

Apparatus, systems, and methods described in this specification store energy by liquefying a gas such as air, for example, and then recover the energy by regasifying the liquid air and expanding the gas through one or more turbines. The turbines may drive one or more generators to generate electricity. The process of liquefying the gas may be powered with electric power from the grid, for example. Hence, in effect these apparatus, systems, and methods may provide for storing electric power from the grid and then subsequently delivering it back to the grid. The electricity for liquefying the gas may be provided, for example, from base load power generation or from renewable resources that would otherwise be curtailed, and therefore may be effectively low cost.

In one aspect, a method of storing and recovering energy comprises pressurizing liquid air or liquid air components to a pressure greater than or equal to about 80 atmospheres, regasifying the pressurized liquid air or liquid air components to produce pressurized gaseous air or gaseous air components at a pressure greater than or equal to about 80 atmospheres using heat produced by combusting an exhaust gas stream from a high pressure turbine with a gaseous fuel, expanding the pressurized gaseous air or gaseous air components through the high pressure turbine to form the exhaust gas stream, and producing electricity with a generator driven by the high pressure turbine.

In another aspect, a method of storing and recovering energy comprises pressurizing liquid air or liquid air components to a pressure greater than or equal to about 80 atmospheres or greater than or equal to about 120 atmospheres, regasifying the pressurized liquid air or liquid air components to produce pressurized gaseous air or gaseous air components at a pressure greater than or equal to about 80 atmospheres or greater than or equal to about 120 atmospheres using heat produced by combusting uncombusted gaseous air or gaseous air components in a first exhaust gas stream from a combustion turbine with a gaseous fuel, expanding the pressurized gaseous air or gaseous air components through a high pressure turbine to form a second exhaust gas stream at a pressure of about 10 to about 30 atmospheres, producing electricity with a generator driven by the high pressure turbine, combusting the second exhaust gas stream with a fuel to form a gaseous working fluid at an elevated temperature, expanding the gaseous working fluid through the combustion turbine to form the first exhaust gas stream, and producing additional electricity with a generator driven by the combustion turbine.

In another aspect, a method of storing and recovering energy comprises pressurizing liquid air or liquid air components to a pressure greater than or equal to about 80 atmospheres or greater than or equal to about 120 atmospheres, regasifying the pressurized liquid air or liquid air components to produce pressurized gaseous air or gaseous air components at a pressure greater than or equal to about 80 atmospheres or greater than or equal to about 120 atmospheres and a temperature of about −20° C. to about 100° C., further heating the pressurized gaseous air or gaseous air components using heat produced by combusting uncombusted gaseous air or gaseous air components in a first exhaust gas stream from a combustion turbine with a gaseous fuel, expanding the pressurized gaseous air or gaseous air components through a high pressure turbine to form a second exhaust gas stream at a pressure of about 10 to about 30 atmospheres, producing electricity with a generator driven by the high pressure turbine, combusting the second exhaust gas stream with a gaseous fuel to form a gaseous working fluid at an elevated temperature, expanding the gaseous working fluid through the combustion turbine to form the first exhaust gas stream, and producing additional electricity with a generator driven by the combustion turbine.

In some variations, the heat used to regasify the liquid air or liquid air components is not derived from combusting uncombusted gaseous air or gaseous air components in the first exhaust gas stream with a fuel or from combusting the second exhaust gas stream with a fuel, although these may be heat sources for this step in other variations. In some variations the heat used to regasify the liquid air or liquid air components may be drawn from ambient sources (e.g., ambient air), for example.

In another aspect, a method of storing and recovering energy comprises compressing gaseous air, combusting the compressed gaseous air with a gaseous fuel to form a hot gaseous working fluid, expanding the hot gaseous working fluid through a first turbine to form an exhaust gas stream, producing electricity with a generator driven by the first turbine, pressurizing liquid air or liquid air components to a pressure greater than or equal to about 80 atmospheres, regasifying the pressurized liquid air or liquid air components to produce pressurized gaseous air or gaseous air components at a pressure greater than or equal to about 80 atmospheres and a temperature of about −20° C. to about 100° C., further heating the pressurized gaseous air or gaseous air components using heat from the exhaust gas stream from the first turbine, expanding the pressurized gaseous air or gaseous air components through a high pressure turbine, and producing electricity with a generator driven by the high pressure turbine.

In some variations, the heat used to regasify the liquid air or liquid air components is not derived from the exhaust gas stream from the first turbine. In some variations the heat used to regasify the liquid air or liquid air components may be drawn from ambient sources (e.g., ambient air), for example.

These and other embodiments, features and advantages of the present invention will become more apparent to those skilled in the art when taken with reference to the following more detailed description of the invention in conjunction with the accompanying drawings that are first briefly described.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

Figure 1:
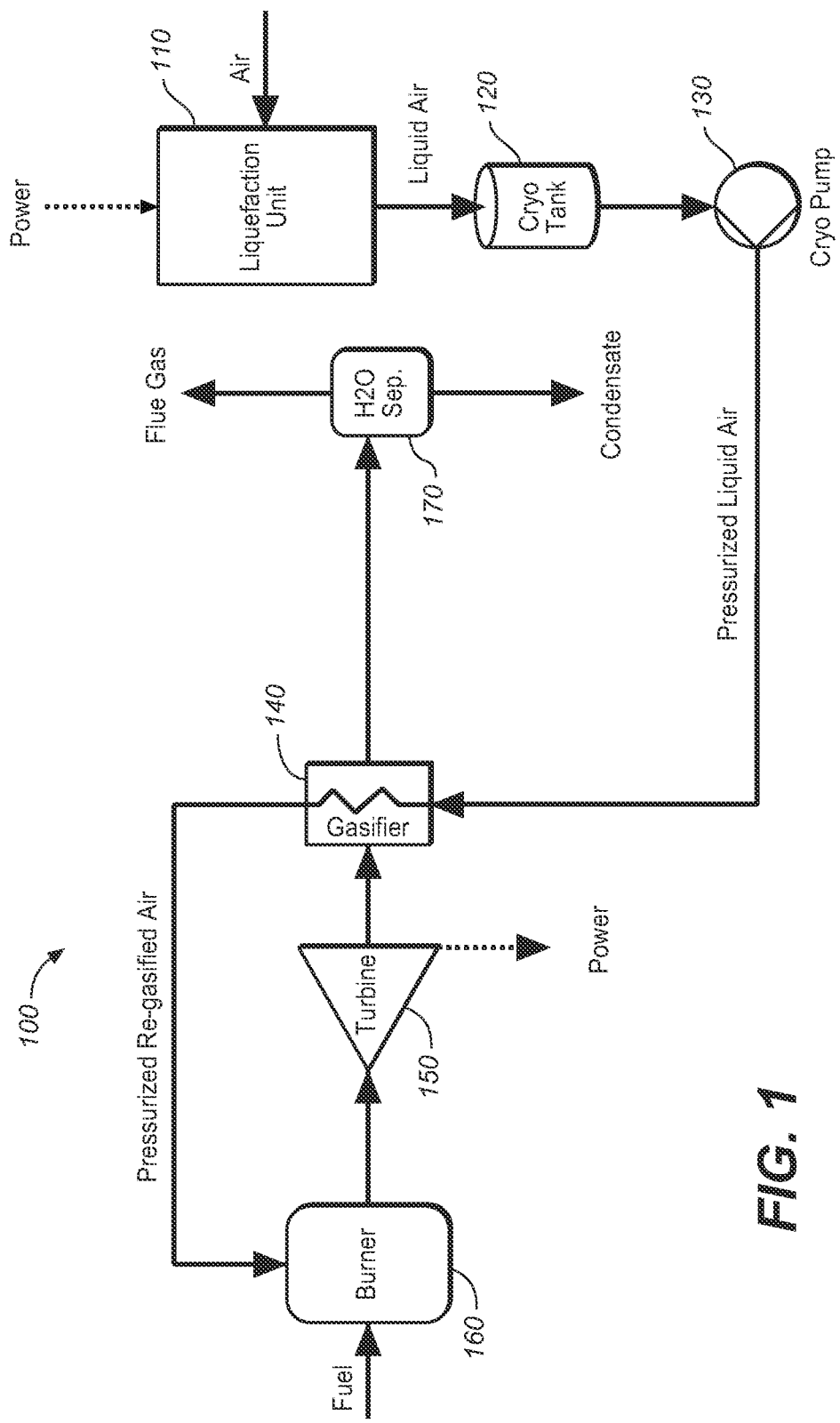
FIG. 1 shows a block diagram of an example simple Liquid Air Power and Storage (LAPS) system.

FIG. 1 shows an example simple LAPS configuration 100 similar to those disclosed in U.S. patent application Ser. No. 14/546,406 referred to above. In this example power is used by liquefaction unit 110 to liquefy air for storage in cryotank 120, which is an insulated low pressure storage vessel. For power generation, liquid air is pressurized by cryopump 130 and re-gasified in gasifier (e.g., heat exchanger) 140 using heat from the exhaust of power turbine 150. Fuel (e.g., natural gas) is combusted with the pressurized regasified air in burner 160 and the hot combustion gas mix drives the power turbine. Water is condensed and separated from flue gas in separator 170. Steam may be mixed with the air and fuel in burner 160. Pressurized cooling air, for example derived from the regasified air stream, may be supplied to the hot turbine section.

Optionally, the exhaust gas from the turbine and the liquid air may serve respectively as heat source and heat sink for a bottoming power cycle, which may be for example an organic Rankine cycle.

The simple LAPS configuration shown in FIG. 1 is analogous to a Brayton Cycle combustion turbine generator, except that for LAPS the air compression is done in steps, which include liquefying the air, followed by pumping the liquid and then regasifying. This allows the majority of the work required for compression to be separated in space and time from the useful work of power generation, thereby facilitating the use of liquid air for energy storage.

High pressures are desired when driving a turbine because the specific work, power per unit of working fluid, is proportional to the pressure difference across the turbine. Although efficiency is proportional to the temperature of the working fluid, it is technically or economically challenging to use a working fluid at both very high temperature and very high pressure, because the pressure-containing materials weaken at high temperature. For example, steam turbines operate at working pressures of 150 to 200 bar with working fluid at 550° C. In contrast combustion turbines may have turbine inlet temperatures of about 1400° C., but typically have far lower working pressures, on the order of 15 to 20 bar. High working fluid temperatures necessitate the diversion of substantial quantities of working fluid to cool the pressure boundary and other highly stressed components. However, working fluid diverted for cooling purposes does not produce useful work, so increasing the turbine inlet temperature faces diminishing returns.

Turbo-expanders or air turbines (together referred to herein as high pressure turbines) are available from manufacturers such as MAN, with working pressures of, for example, up to 140 bar at 540° C. An HPLAPS system utilizing such a turbo expander or air turbine for turbine 150 in the configuration shown in FIG. 1 would use a high pressure burner to heat the pressurized (e.g., 140 bar) and re-gasified air to the (e.g., 540° C.) maximum turbine inlet temperature.

Figure 2:
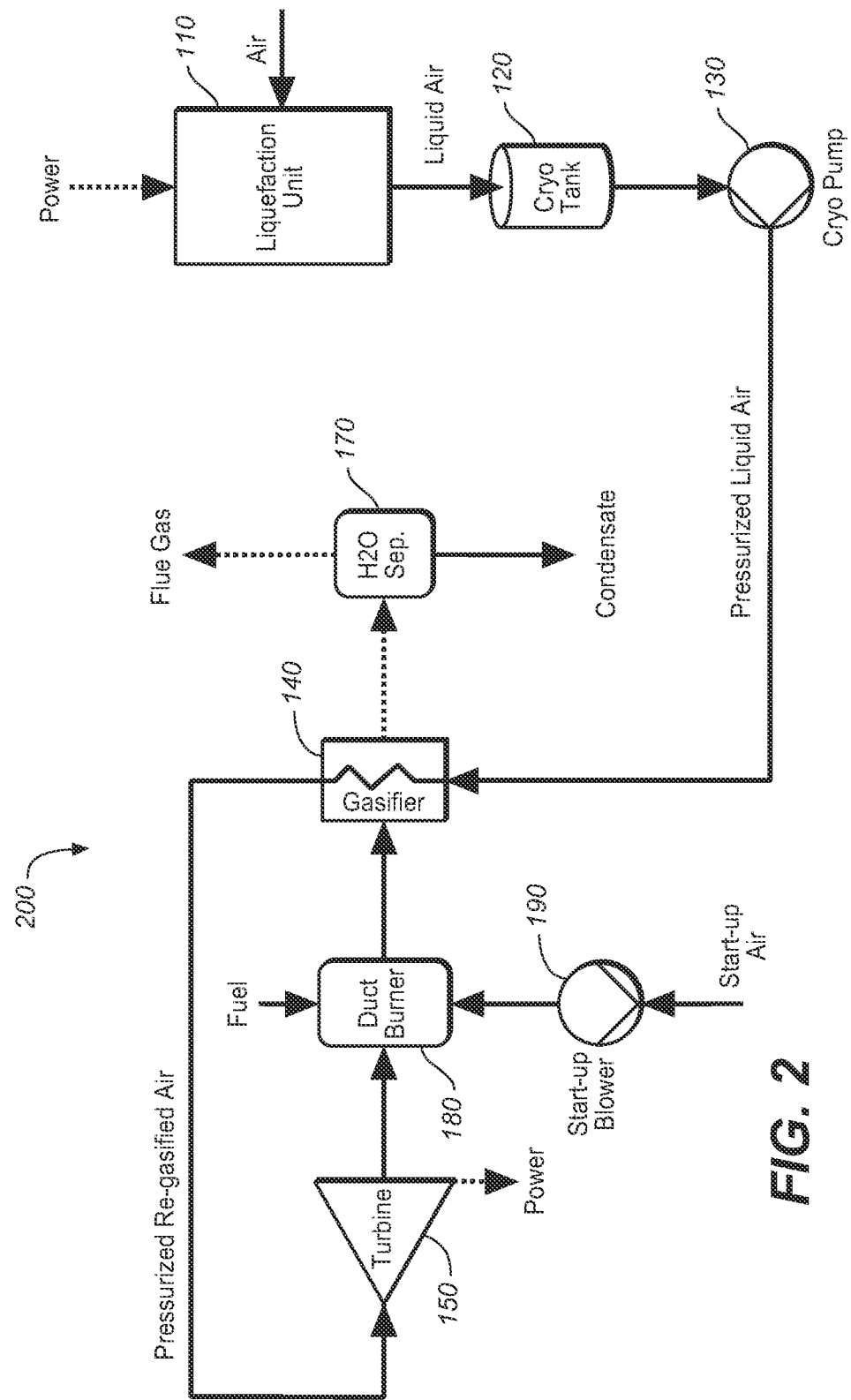
FIG. 2 shows a block diagram of an example simple High Pressure Liquid Air Power and Storage (HPLAPS) system.

Instead of using a high pressure burner, a simple HPLAPS system 200 using a high pressure turbo-expander or air turbine for turbine 150 could instead be implemented as shown in the example of FIG. 2. In this configuration all combustion occurs at atmospheric pressure in a duct burner 180 positioned in the exhaust stream of high pressure turbine 150. Liquid air is pressurized by cryopump 130 (e.g., to about 140 bar), re-gasified in gasifier 140 using heat from duct burner 180, expanded through high pressure turbine 150, and then exhausted from the turbine at about 1 atmosphere and combusted with a fuel (e.g., natural gas) in duct burner 180 to heat regasifier 140. At start-up, a blower 190 pushes ambient air into duct burner 180 where it is combusted with fuel to heat gasifier 140 and begin regasifying liquid air for expansion through turbine 150. The flow rate and pressure of the liquid air may be adjusted (e.g., ramped up) during startup as limited by the air flow rate of blower 190, by controlling the cryopump speed or recycling a fraction of the liquid air to cryotank 120. The liquid air pressure may have a transient ramp-up pressure of greater than or equal to about 5 atmospheres during start-up, for example. Additional fuel may be added as exhaust air from turbine 150 is mixed with air from blower 190. After startup the duct burner fuel flow may be controlled to maintain the specified turbine inlet temperature. Blower 190 may be shut down after start-up, or optionally continue to run.

In an HPLAPS system configured as in FIG. 2 the exhaust from the turbine may be cold enough to warrant preheating before it enters the duct burner. In addition, to extract all or nearly all of the latent heat of condensation from water vapor in the exhaust stream exiting the duct burner and transfer that heat to the regasified liquid air, gasifier 140 may be configured and operated to chill the exhaust from the duct burner to near 0° C. To avoid a visible plume at the stack, the flue gas can be reheated after the gasifier.

Figure 3:
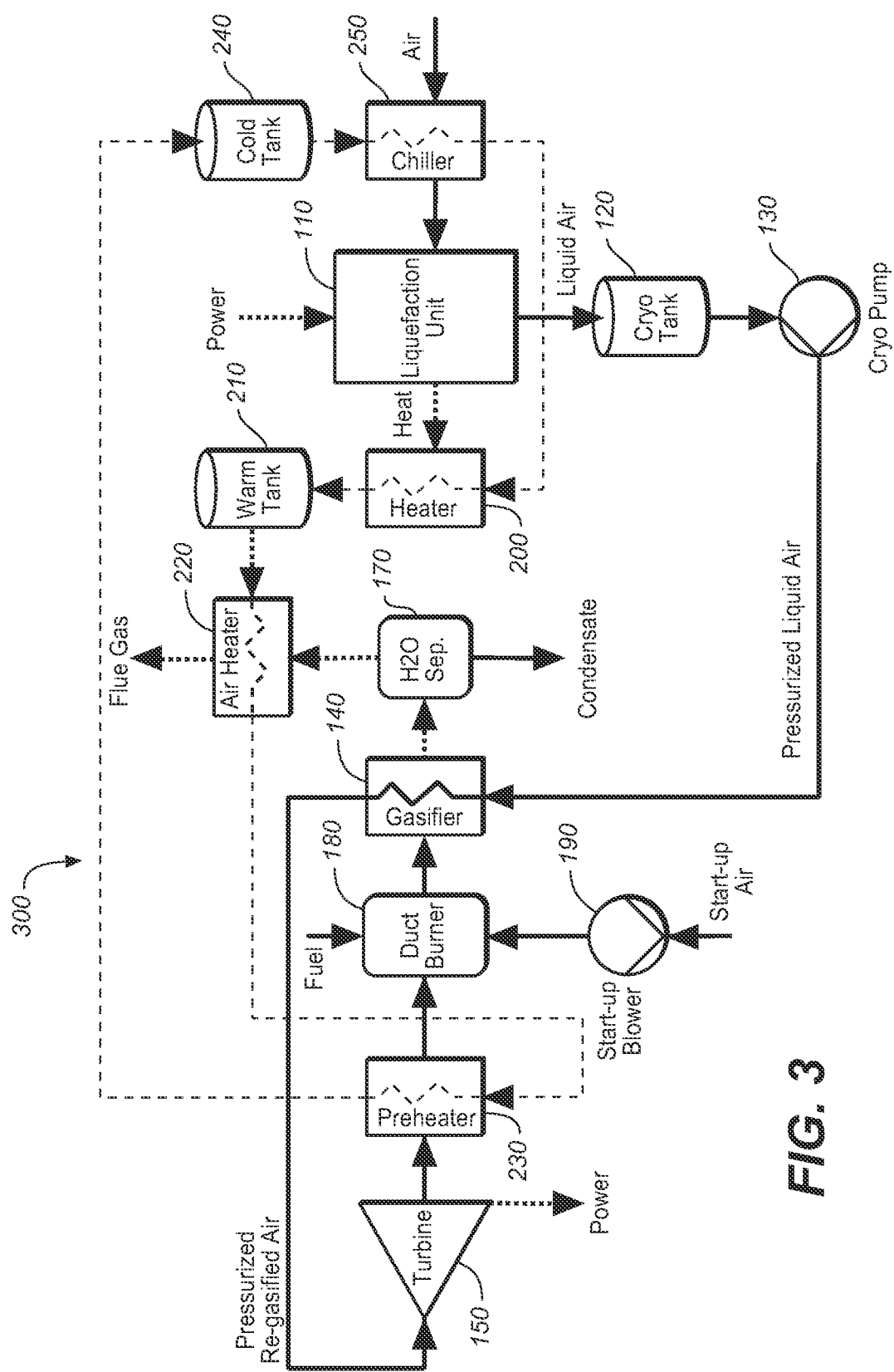
FIG. 3 shows a block diagram of an example HPLAPS as in FIG. 2 further comprising an air preheat and flue gas reheat subsystem.

Such pre-heating and reheating can be accomplished, for example, as shown in HPLAPS system 300 of FIG. 3. In this example, heat rejected from liquefaction unit 110 warms a heat transfer fluid as it passes through heater (e.g., heat exchanger) 200. The warmed heat transfer fluid, which may optionally be stored in warm tank 210, is then circulated through air heater 220 to reheat the flue gas and through preheater 230 to preheat the exhaust stream from turbine 150. After passing through preheater 230, the now cooled heat transfer fluid may optionally be stored in cold tank 240 before passing through air chiller (e.g., heat exchanger) 250, where it precools air to be liquefied in the liquefaction unit, and then cycle again through heater 200. The cold tank 240 and warm tank 210 provide energy storage within the LAPS process to improve the process efficiency, in contrast to the cryotank 120, which stores energy from outside the LAPS process. The heat transfer fluid may be water or a coolanol, for example, such as a solution of water and ethylene glycol, commonly known as anti-freeze. Any other method of preheating air before it enters the duct burner and/or reheating flue gas may also be used. Some variations may preheat air to the duct burner but not reheat flue gas. Other variations may reheat flue gas, but not preheat air to the duct burner.

Table 1 below shows the estimated performance of the HPLAPS system 300 of FIG. 3 for example operating parameters. Assuming that the turbine exhaust air is preheated to 20.0° C., the preheat duty of 1.9 MW could help to reduce the power requirement of the air liquefaction system by about 8%.

Figure 4:
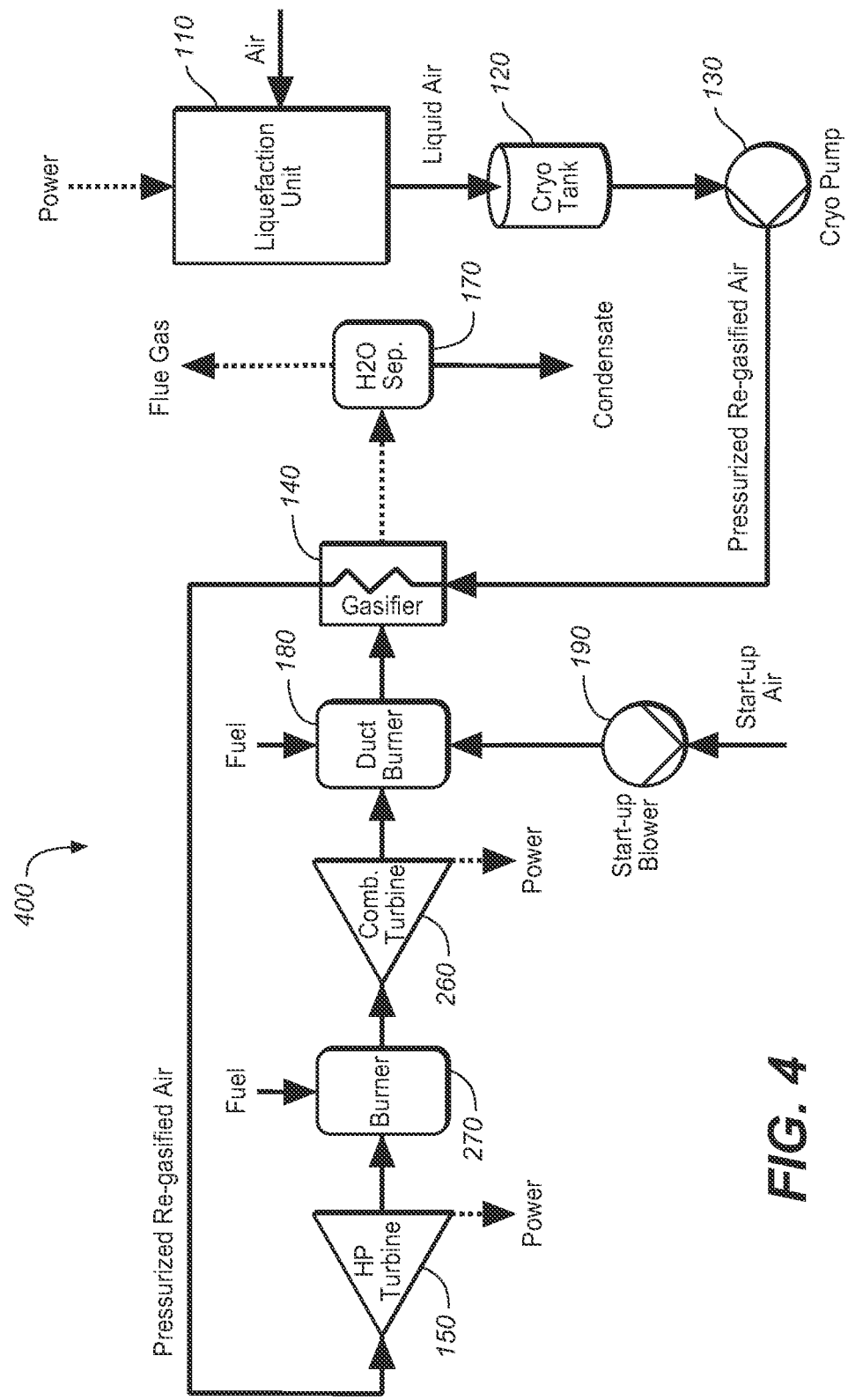
FIG. 4 shows a block diagram of an example HPLAPS system as in FIG. 2 further comprising a combustion turbine.

FIG. 4 shows an example HPLAPS system that combines the high pressure turbine of FIG. 2 and FIG. 3 with the combustion turbine of FIG. 1. In HPLAPS system 400 of FIG. 4, liquid air is pressurized by cryopump 130 (e.g., to about 140 bar), re-gasified in gasifier 140 using heat from duct burner 180, expanded through high pressure turbine 150 to generate power, and exhausted from the high pressure turbine 150 at the (e.g., 15-20 bar) inlet pressure for combustion turbine 260. The medium pressure air exhausted from high pressure turbine 150 is combusted in burner 270 with a fuel (e.g., natural gas), and then the hot combustion gas mix (e.g., at about 1112° C.) is expanded through combustion turbine 260 to generate additional power. Uncombusted air in the exhaust stream from combustion turbine 260, optionally mixed with additional air provided by blower 190, is then combusted with a fuel (e.g., natural gas) in duct burner 180 to raise its temperature (e.g., to about 720° C.) and heat gasifier 140. At start-up, blower 190 pushes ambient air into duct burner 180 where it is combusted with fuel to heat gasifier 140 and begin regasifying liquid air for expansion through turbine 150. After startup the duct burner fuel flow may be controlled to maintain the specified turbine inlet temperature for the high pressure turbine. Blower 190 may be shut down after start-up, or optionally continue to run. As shown in HPLAPS system 500 of FIG. 5, the HPLAPS configuration of FIG. 4 may comprise a flue gas reheating system as shown in FIG. 3.

Table 1 shows the estimated performance of the HPLAPS system 400 of FIG. 4 for example operating parameters.

Figure 5:
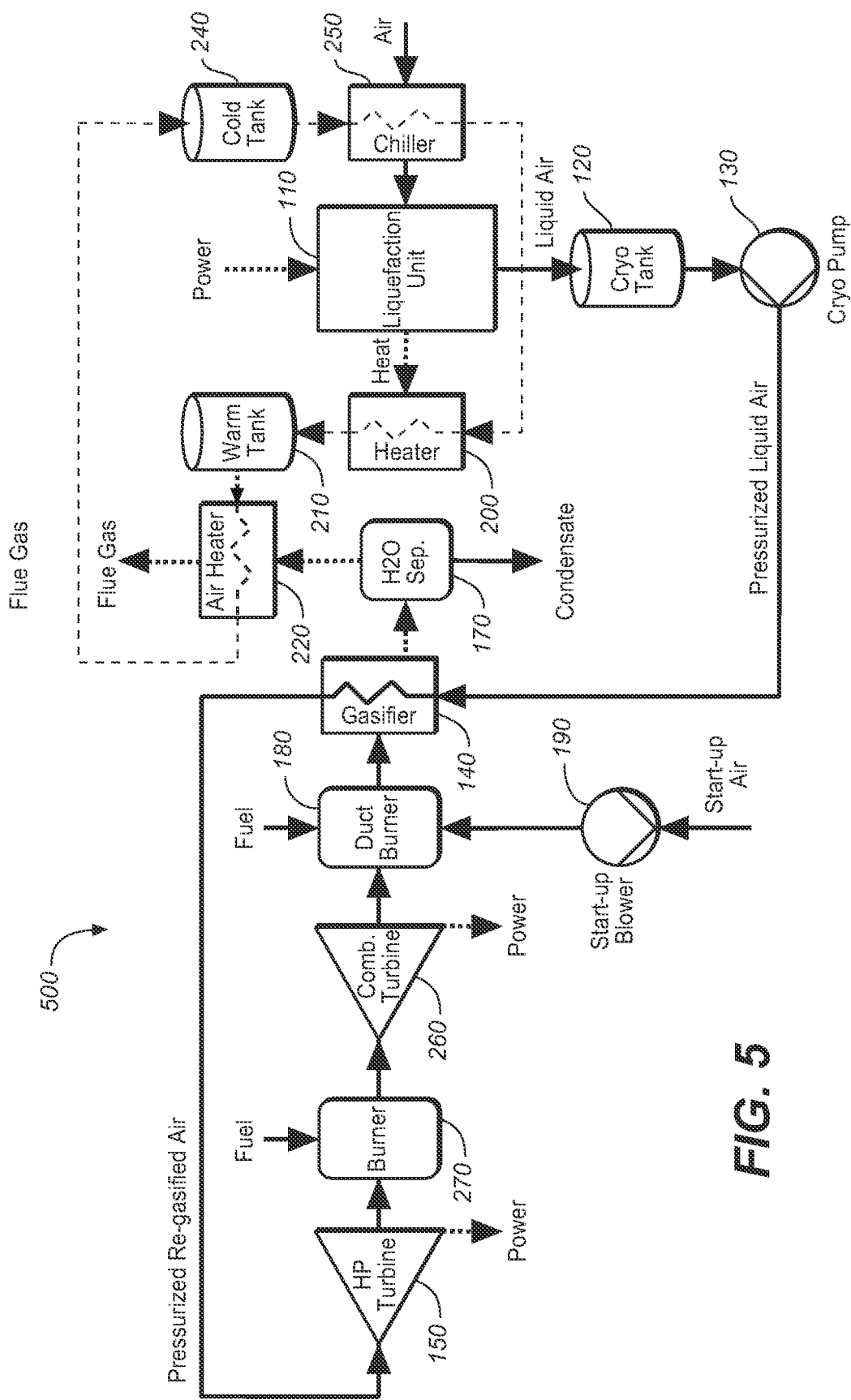
FIG. 5 shows a block diagram of an example HPLAPS as in FIG. 4 further comprising a flue gas reheat subsystem.

An advantage of the example configurations shown in FIG. 4 and FIG. 5 is that although they operate with both a high total pressure drop (e.g., 140 bar) and at high temperature (e.g., 1112° C.), no single expansion step occurs at both high pressure and high temperature. This facilitates the mechanical design of the expander casings, permitting pressure containing parts to be made of thinner walls to reduce cost and thermal stress, thereby also reducing startup time. As shown in Table 1 below, the combination of high pressure air expansion and high temperature air expansion results in substantially increased power output and efficiency. Another advantage of the example configurations shown in FIG. 4 and FIG. 5 is that the pressure and temperature at the inlet to combustion turbine 260 is lower than in the examples shown in the related U.S. patent application Ser. No. 14/546,406, which may provide operational and economic advantages.

Figure 6:
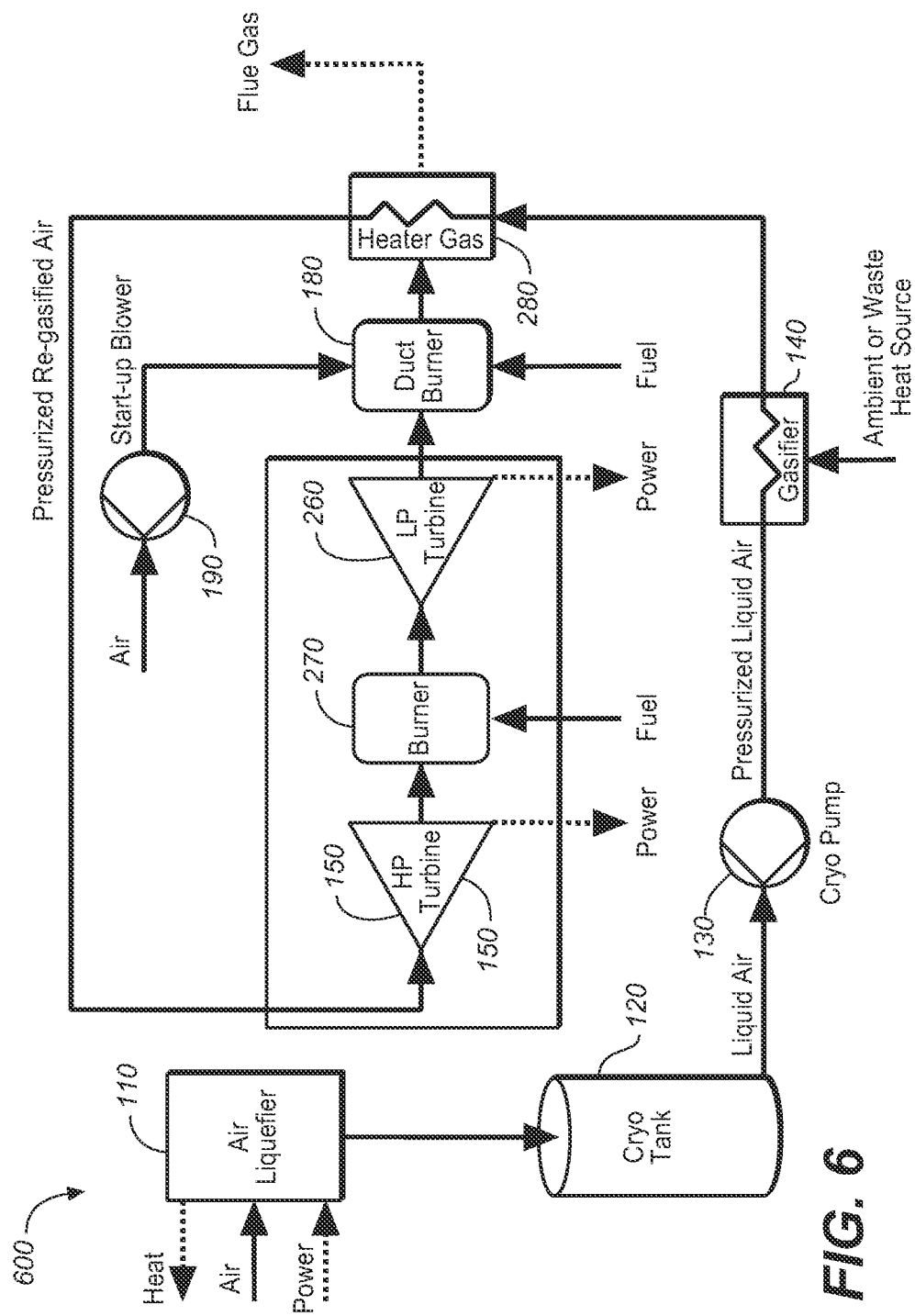
FIG. 6 shows a block diagram of another example HPLAPS system.

FIG. 6 shows another example HPLAPS system that comprises a high pressure turbine and a combustion turbine similarly to the examples of FIG. 4 and FIG. 5. HPLAPS system 600 of FIG. 6 differs from the examples of FIG. 4 and FIG. 5 by using a low temperature heat source to regasify the pressurized liquid air, instead of regasifying the liquid air in the reheated exhaust stream from the combustion turbine. The intent is to use available but otherwise low thermodynamic potential heat as a supplement and to improve the exergetic efficiency by more closely matching the liquid air stream temperature to the warming stream temperature. Referring to FIG. 6, in HPLAPS system 600 liquid air is pressurized by cryopump 130 and then re-gasified in gasifier 140 using low temperature heat that may be from a source external to the LAPS process and system. For example, the low temperature heat may be drawn from ambient sources (e.g., ambient air) or be waste heat from another process including for example heat that had been previously captured and stored, rather than derived from the combustion turbine burner or the duct burner (although those may also be acceptable heat sources). The regasification from an external source may also provide a cooling function to the external process, such as for example condensing steam from a steam turbine. The re-gasified air produced in gasifier 140 is further heated in gas heater 280 with heat from the reheated exhaust stream from combustion turbine 260, and then provided to the inlet of high pressure turbine 150. HPLAPS system 600 otherwise operates similarly to example HPLAPS systems 400 and 500 shown in FIG. 4 and FIG. 5.

In HPLAPS system 600 the liquid air may be evaporated and warmed in gasifier 140 to about −20° C. to about 100° C., for example, (e.g., to about 0° C.) before entering gas heater 280. This may prevent the reheated exhaust stream from combustion turbine 260 from being cooled below the dew point by heat exchange with gas heater 280, and thereby prevent the condensation of water of combustion and eliminate or reduce the need for a water separator and related equipment.

Table 1 shows the estimated performance of the HPLAPS system 600 of FIG. 6 for example operating parameters.

Figure 7:
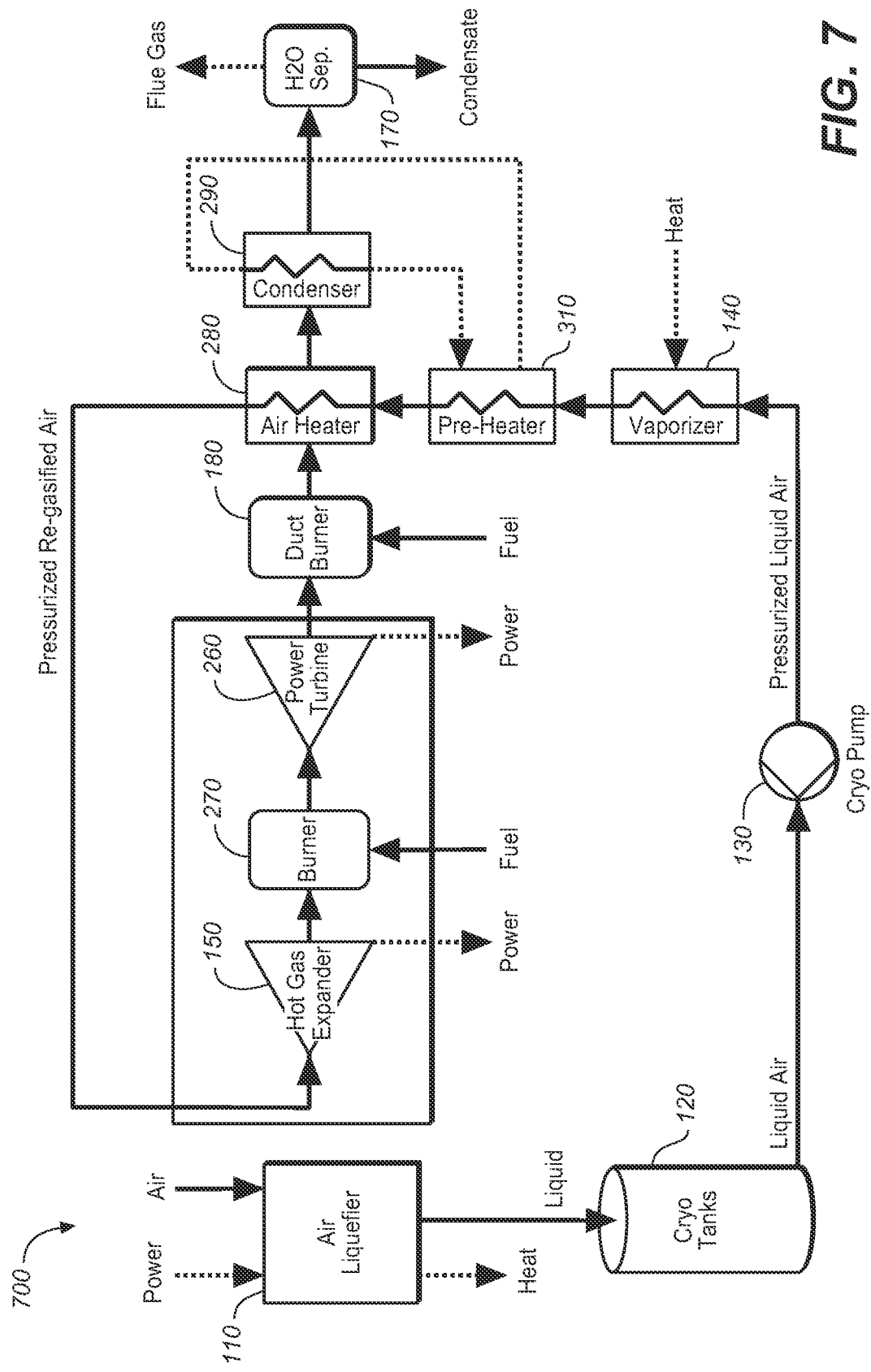
FIG. 7 shows a block diagram of an example HPLAPS system as in FIG. 6 further comprising a flue gas condenser and a regasified air pre-heater that uses heat recovered by the flue gas condenser.

FIG. 7 shows another example HPLAPS system that comprises a high pressure turbine and a combustion turbine similarly to the examples of FIG. 4, FIG. 5, and FIG. 6. As in example HPLAPS system 600 of FIG. 6, HPLAPS system 700 of FIG. 7 uses gasifier 140 (also referred to herein as "vaporizer 140") to vaporize the pressurized liquid using low temperature heat, after which gas heater 280 (also referred to herein as an "air heater 280") heated by the reheated exhaust gas stream from combustion turbine 260 is used exclusively for sensible heating of the regasified liquid air. HPLAPS system 700 differs from the example of FIG. 6 by including a flue gas condenser 290 to recover heat from the water of combustion in the exhaust gas stream, and a pre-heater 310 positioned between vaporizer 140 and air heater 280 that uses heat recovered by the condenser to pre-heat the regasified air before it enters air heater 280. Optionally, a start-up heater may be integrated into pre-heater 310. HPLAPS system 700 otherwise operates similarly to example HPLAPS system 600 of FIG. 6.

In HPLAPS system 700 the liquid air may be evaporated and warmed in gasifier 140 to about −60° C. to about 20° C., for example, and then further heated in preheater 310 to about 50° C. to about 130° C., for example, before entering air heater 280.

Table 1 shows the estimated performance of the HPLAPS system 700 of FIG. 7 for example operating parameters.

In the examples of FIG. 6 and FIG. 7 vaporizer/regasifier 140 may optionally be interfaced to a thermal storage system (e.g., a conventional ice thermal storage system) used to pre-chill inlet air to the liquefaction system, or for cooling other processes. Also, vaporizer/regasifier 140 may optionally be used as an additional or alternative heat sink for flue gas condenser 290, in which case the flue gas may be cooled for example to about 1° C., condensing more water vapor from the flue gas. In the examples of FIG. 4, FIG. 5, FIG. 6, and FIG. 7, steam may be mixed with the air and fuel in burner 270. Pressurized cooling air, for example derived from the regasified air stream, may be supplied to the hot combustion turbine section 260. Optionally, the exhaust gas from the combustion turbine and the liquid air may serve respectively as heat source and heat sink for a bottoming power cycle, which may be for example an organic Rankine cycle. Optionally, heat rejected from the liquefaction system may be used to reheat flue gas to avoid a visible plume as shown, for example, in FIG. 3 and FIG. 5.

Referring again to FIG. 7, in one variation HPLAPS system 700 is operated to generate power by pumping liquid air from the storage tank and raising its pressure to about 150 bar, vaporizing the liquid air and warming it to about −40° C. in gasifier 140 using heat transferred from the atmosphere, further warming the regasified air to about 120° C. in pre-heater 310 using heat recovered from the flue gas by flue gas condenser 310, further heating the regasified air to about 540° C. in air heater 280 using heat recovered from the reheated exhaust gas stream from combustion turbine 260, introducing the regasified air into high pressure turbine 150 at about 540° C. and 140 bar and expanding it through the high pressure turbine to exhaust at about 232° C. and about 18 bar, mixing the exhaust from high pressure turbine 150 with natural gas fuel and combusting it to form a gaseous working fluid at about 1112° C. and about 17.5 bar, expanding the gaseous working fluid through combustion turbine 260 to exhaust at about 490° C. and a pressure of about 12 inches of water, reheating the exhaust gas stream from the combustion turbine to about 551° C., and transferring heat from the reheated exhaust gas stream to regasifed air in air heater 280. The exhaust gas then exits air heater 280 at about 143° C. and flows through flue gas condenser 310, leaving the system at about 28° C. and atmospheric pressure. Any other suitable operating parameters may also be used.

As shown in Table 1, overall fuel consumption in HPLAPS system 600 and HPLAPS system 700 may be reduced compared to that of HPLAPS system 300 and HPLAPS system 400 by the introduction of heat from outside the LAPS system and by recapturing heat from the flue gas.

Figure 8A:
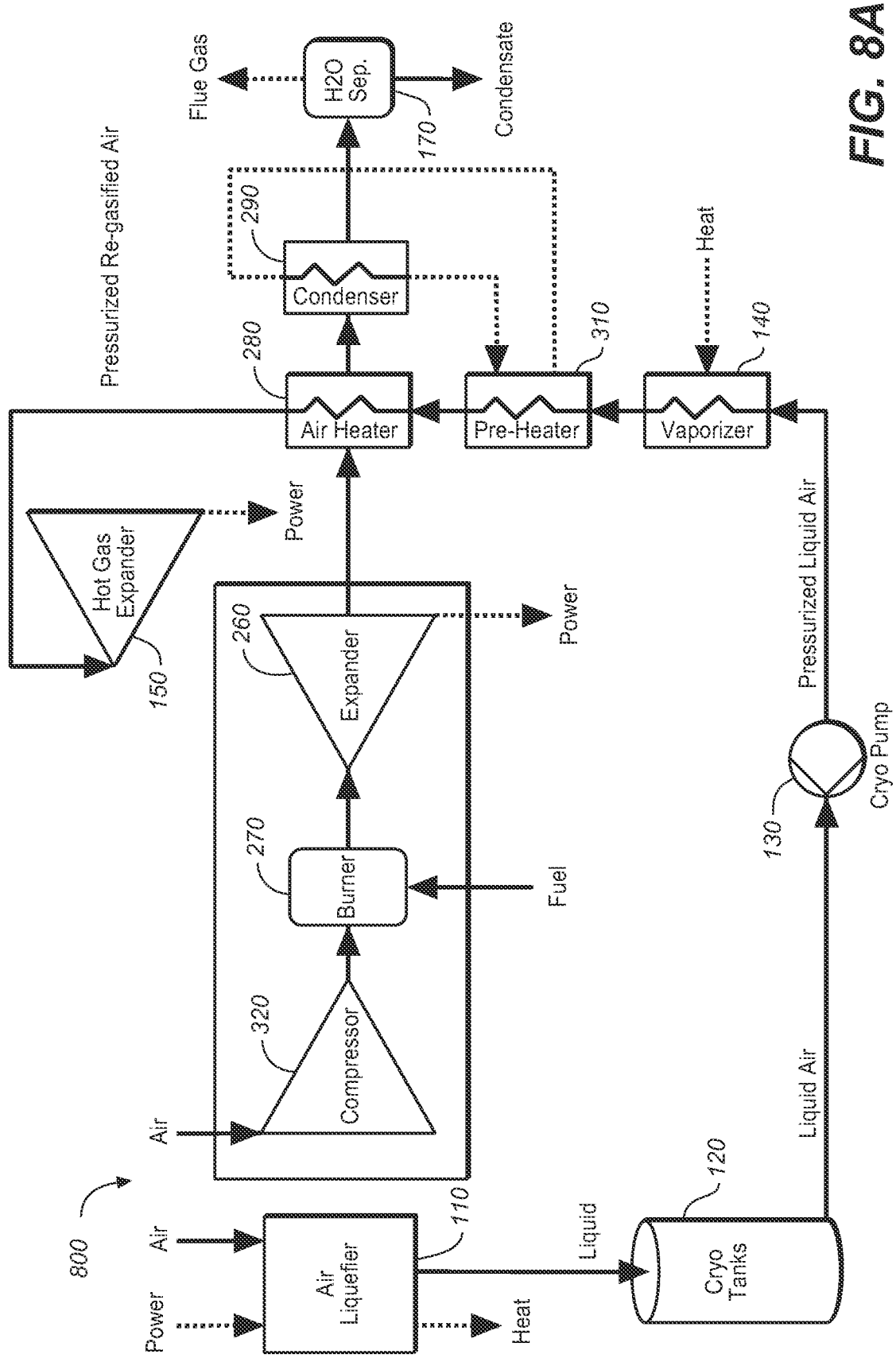
FIGS. 8A, 8B, 9A, and 9B show block diagrams of additional example HPLAPS systems.

FIG. 8A shows another example HPLAPS system. In this example, HPLAPS system 800 comprises a high pressure turbine and a conventional combustion turbine comprising a compressor 320, a burner 270, and a power turbine (expander) 260. The inlet air to the compressor section of the combustion turbine is primarily or exclusively drawn in a conventional manner from the ambient environment, though in some variations the inlet air may comprise some regasified liquid air as well.

In one variation compressor 320 compresses the inlet air to a pressure of, for example, about 17.5 bar, after which the compressed air is combusted with a gaseous fuel (e.g., natural gas) in burner 270 to form a hot gaseous working fluid at a temperature of, for example, about 1112° C. and a pressure of, for example, about 17.5 bar. The hot gaseous working fluid is expanded across expander 260 to generate power, and exhausted from the expander at a temperature of about 495° C. and a pressure of about 1.028 bar. Cryopump 130 pumps liquid air from storage tank 120 and raises its pressure to about 150 bar. The pressurized liquid air is vaporized and warmed to a temperature of about −40° C. in gasifier 140 using heat transferred from the atmosphere. The regasified air is further heated to about 120° C. in preheater 310 using heat recovered from the flue gas by flue gas condenser 310 and then to about 470° C. in air heater 280 using heat recovered from the exhaust gas stream from power turbine 260. The heated regasified air is then introduced into high pressure turbine (hot gas expander) 150 at about 470° C. and 140 bar and expanded through the high pressure turbine to generate power. The exhaust from high pressure turbine 150 is at or near atmospheric pressure, rather than at an intermediate pressure as in HPLAPS systems 400, 500, 600, and 700 described above. The combustion turbine (compressor 320, burner 270, expander 260) and the high pressure expander 150 may be conventional "off the shelf" equipment, which reduces technical risk compared to systems requiring customized equipment.

Figure 8B:
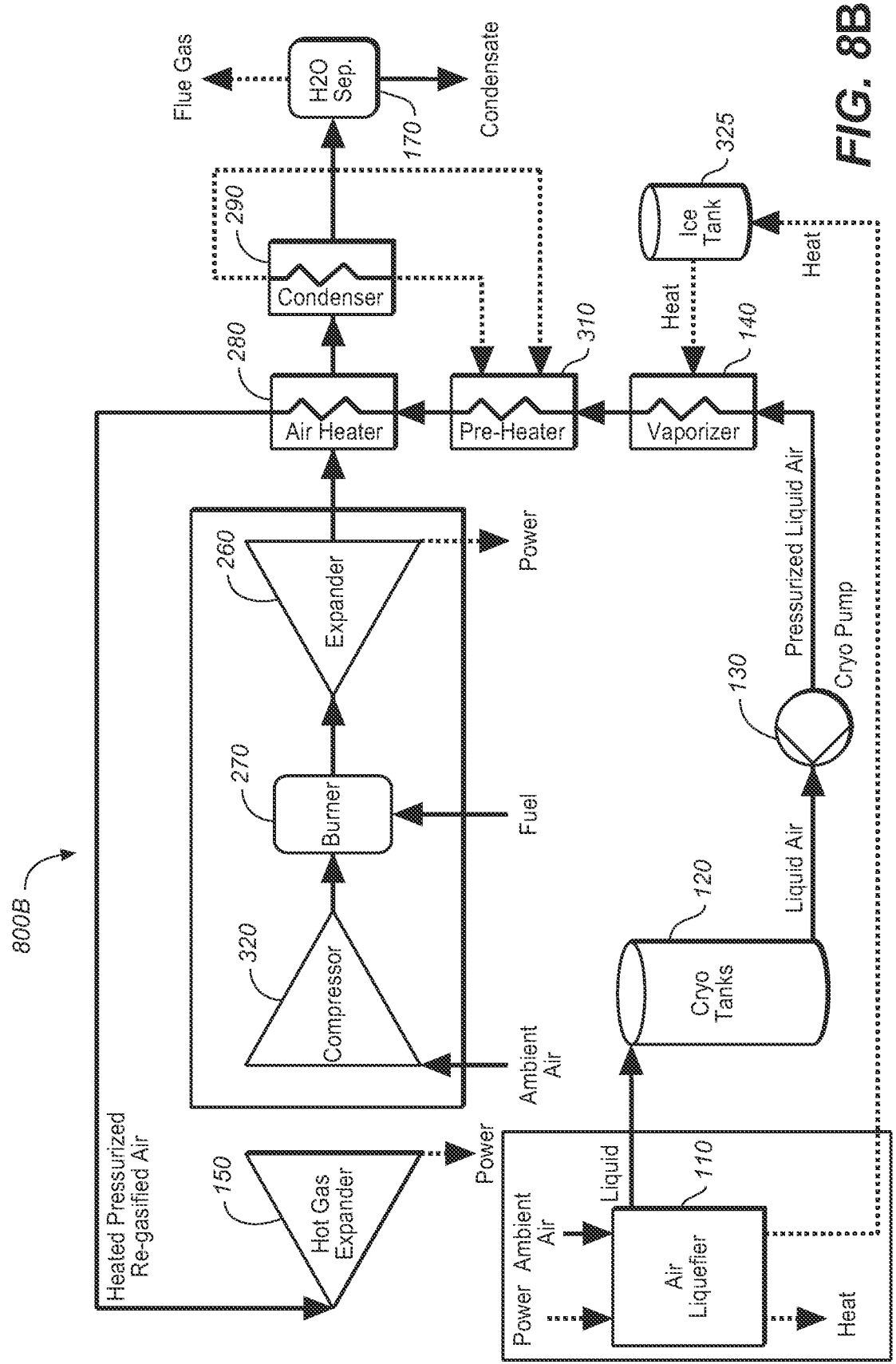

The exhaust from the high pressure turbine may be at a temperature well below the freezing point of water. Cold may be captured from the liquid air and/or from the high pressure turbine exhaust to assist with liquefaction of air at a later time, using ice storage for example as shown in example HPLAPS system 800B of FIG. 8B. Evaporation of liquid air in vaporizer 140 requires heat, which could be provided by freezing water or brine in ice tank 325, for example by circulating a non-freezing heat transfer fluid, such as ethylene-glycol and water, between vaporizer 140 and ice tank 325. During the charging phase, when air liquefier 110 is operating, the heat transfer fluid could be circulated between air liquefier 110 and ice tank 325 to absorb heat rejected from the air liquefier 110, to pre-chill inlet air entering air liquefier 110, or to provide intercooling within air liquefier 110.

Table 1 shows the estimated performance of HPLAPS system 800 of FIG. 8A for example operating parameters.

Figure 9A:
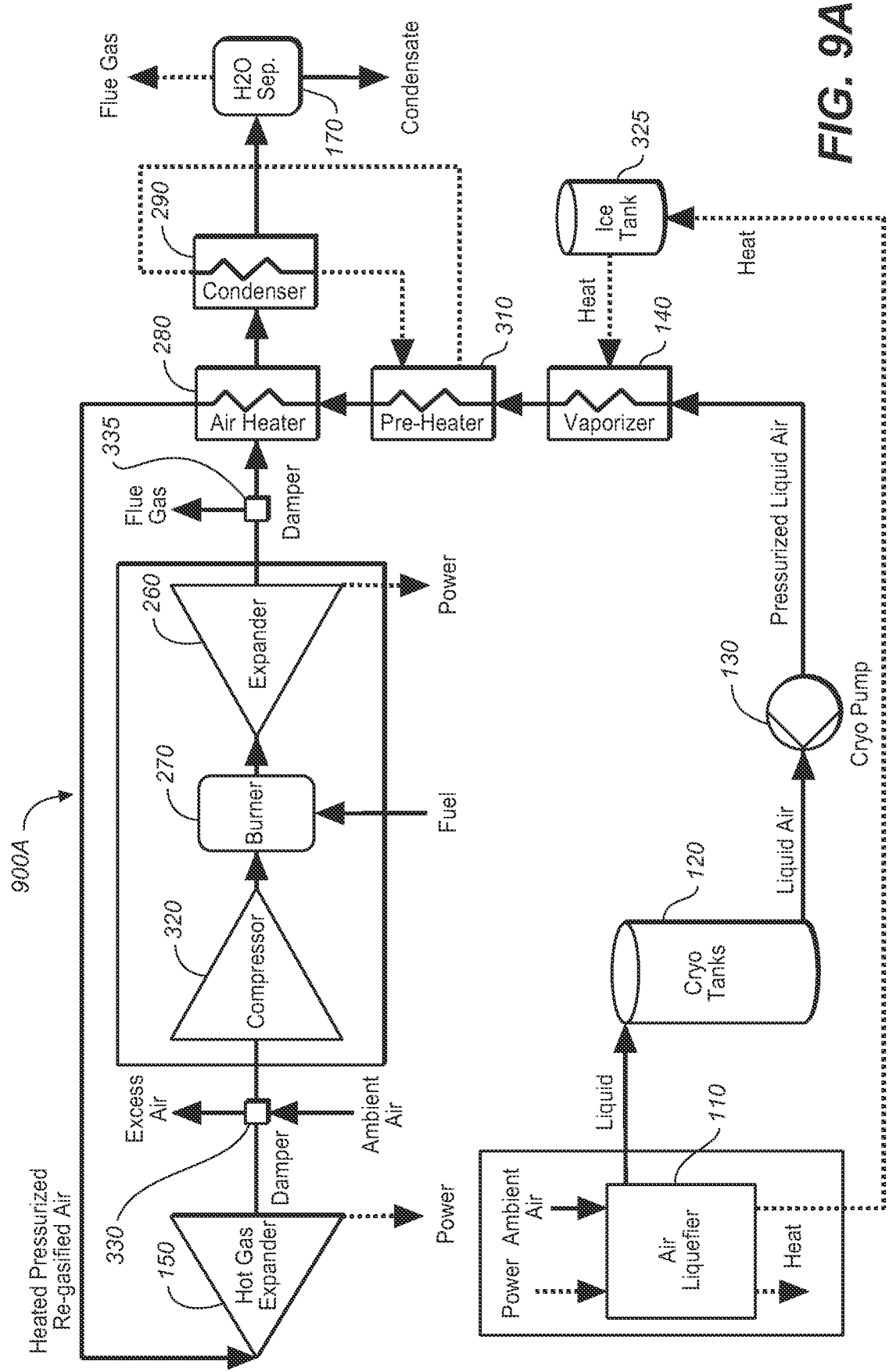

In example HPLAPS system 900A of FIG. 9A air discharged from hot gas expander 150 flows into compressor 320 to supplement or completely replace ambient air. It is not necessary to have the same mass flow rate of air flow through the hot gas expander 150 and the combustion turbine. A damper 330 may be disposed between expander 150 and compressor 320 to discharge air to the atmosphere, to block inlet ambient air, and/or to mix air discharged from hot gas expander 150 with ambient inlet air. Another damper 335 may be disposed between expander 260 and air heater 280 to allow exhaust gas from expander 260 to either flow through or bypass air heater 280, allowing the system to function as either an HPLAPS system or a combustion turbine. The flow rate of air through compressor 320 is governed by the rotational speed of the compressor, which may be fixed in the case of single shaft combustion turbines, and pressure rise, which is influenced by the temperature ratio across the expander 260. In many cases it may be desirable for the air to be discharged from the hot gas expander 150 at a temperature and pressure equivalent to the ISO nominal inlet conditions for compressor 320 of 15° C. and sea level atmospheric pressure. This could be achieved by including a duct burner to raise the temperature of air entering hot gas expander 150 (similarly to duct burner 180 of LAPS system 700), by two or more stages of expansion in hot gas expander 150 with reheat between stages, or by reducing the inlet pressure to hot gas expander 150. Slight adjustment of the hot gas expander 150 inlet pressure and temperature may be used to compensate for the difference in composition of the air discharged from compressor 320 compared to standard air, which includes water vapor, carbon dioxide and trace components that are removed by air liquefier 110.

Figure 9B:
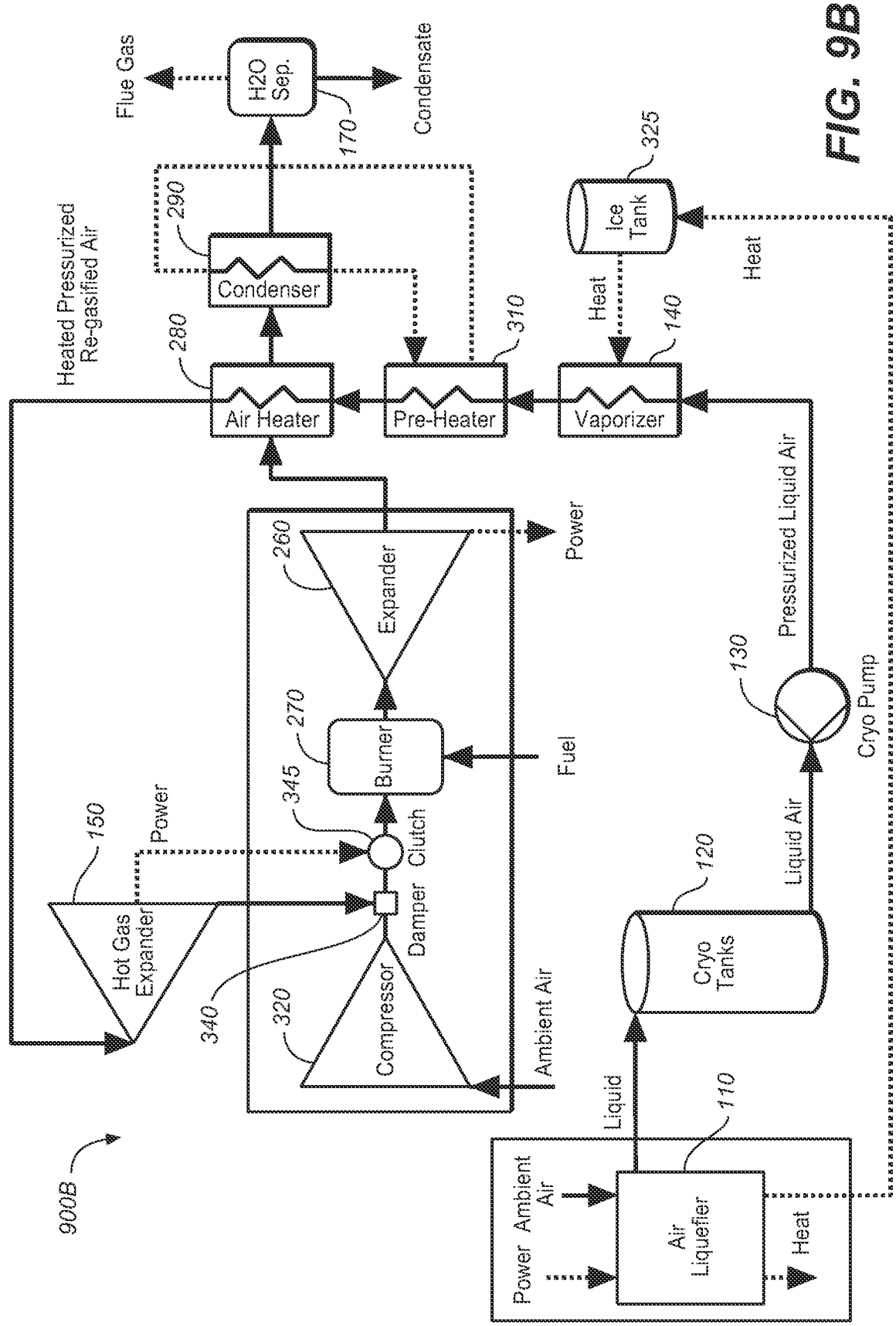

In example HPLAPS system 900B of FIG. 9B the discharge from hot gas expander 150 is at the pressure and temperature conditions of system 600, and the air flows through a damper 340 to permit the burner 270 to be supplied from either compressor 320 or hot gas expander 150. A mechanical clutch 345 may be provided to allow power from expander 260 to be supplied to compressor 320 or combined with power from hot gas expander 150 to produce electric power. Compressor 320, expander 260, and hot gas expander 150 may rotate about a common shaft, or may be offset, and in either case may be connected by gearing in order to permit operation at suitable rotational speeds for the respective components.

Table 1 shows the estimated performance of HPLAPS system 900A of FIG. 9A for example operating parameters. The performance summarized in Table 1 for the various example HPLAPS systems assumes that the liquefaction plant operates 14.4 hours per day in order to produce sufficient liquid air to operate the power generation plant for 5 hours per day.

TABLE 1

| Parameter | HPLAPS System 300 | HPLAPS System 400 | HPLAPS System 600 | HPLAPS System 700 | HPLAPS System 800 | HPLAPS System 900 |
|---|---|---|---|---|---|---|
| Air Flow (kg/s) | 49.1 | 49.1 | 49.1 | 49.1 | 49.1 | 49.1 |
| DB Fuel Flow (kg/s) | 0.8822 | 0.2585 | 0.1289 | 0.075 | 0 | 0 |
| HP Turbine Inlet Temp. (C.) | 540 | 540 | 540 | 540 | 470 | 470 |
| HP Turbine Inlet Pres. (kPa) | 14000 | 14000 | 14000 | 14000 | 14000 | 6731 |
| HP Turbine Outlet Pres (kPa) | 101.325 | 1800 | 1800 | 1800 | 101.325 | 101.325 |
| HP Turbine Outlet Temp. (C.) | 2 | 232 | 232 | 232 | −24 | 15 |
| HP Turbine Power (MW) | 27.48 | 16.40 | 16.58 | 16.58 | 25.4 | 23.3 |
| CT Fuel Flow | — | 1.125 | 1.076 | 1.073 | 0.91 | 0.91 |
| CT Turbine Inlet Temp. (C.) | — | 1112.5 | 1112.2 | 1112.5 | 1112.5 | 1112.5 |
| CT Turbine Inlet Pres. (kPa) | — | 1737.5 | 1737.5 | 1737.5 | 1737.5 | 1737.5 |
| CT Turbine Power (MW) | — | 36.88 | 35.9 | 35.9 | 14.2 | 14.2 |
| Flue Gas Temperature (C.) | 19.85 | 19.85 | 60 | 28 | 18.4 | 26 |
| Condensate Flow (kg/s) | 1.70229 | 2.79048 | 0 | 1.44074 | 1.21 | .88 |
| Heat Rate (kJ/kWh) | 6105 | 5034.7 | 4499.3 | 4442.4 | 4165 | 4332 |

TABLE 1-continued

| Parameter | HPLAPS System 300 | HPLAPS System 400 | HPLAPS System 600 | HPLAPS System 700 | HPLAPS System 800 | HPLAPS System 900 |
|---|---|---|---|---|---|---|
| Flue Reheat Duty (MW) | 0.96 | 0.71 | — | 9.75 | 9.76 | 9.0 |
| Preheat Duty (MW) | 1.9 | — | 16.7 | 13.9 | 13.9 | 13.9 |
| Electric Energy Ratio (MWh out/in) | | | | 69.5% | 50.9% | 52.3% |
| CO2 emissions (kg/MWh) | | | | 222.8 | 216.4 | 225.1 |

This disclosure is illustrative and not limiting. Further modifications will be apparent to one skilled in the art in light of this disclosure and are intended to fall within the scope of the appended claims.

What is claimed is:

1. A method of recovering stored energy from liquid air or liquid air components, the method comprising:
   pressurizing the liquid air or liquid air components to a pressure greater than or equal to about 80 atmospheres;
   regasifying the pressurized liquid air or liquid air components to produce pressurized gaseous air or gaseous air components at a pressure greater than or equal to about 80 atmospheres using heat produced by combusting an exhaust gas stream from a high pressure turbine with a fuel;
   expanding the pressurized gaseous air or gaseous air components through the high pressure turbine to form the exhaust gas stream; and
   producing electricity with a generator driven by the high pressure turbine.

2. The method of claim 1, wherein the pressurized gaseous air or gaseous air components have a temperature of about 450° C. to about 650° C. at an inlet to the high pressure turbine.

3. The method of claim 1, wherein combustion of the exhaust gas stream from the high pressure turbine with the fuel occurs at a pressure of about one atmosphere.

4. The method of claim 1, comprising at start-up of the method regasifying the pressurized liquid air or liquid air components to produce pressurized gaseous air or gaseous air components at a pressure greater than or equal to about 5 atmospheres using heat produced by combusting ambient air with the fuel.

5. The method of claim 1, comprising producing the liquid air or liquid air components in an electrically powered liquefaction process and storing the liquid air or liquid air components for later regasification and expansion through the high pressure turbine.

6. The method of claim 5, comprising preheating the exhaust gas stream from the high pressure turbine with heat rejected from the liquefaction process before combusting the exhaust gas stream from the high pressure turbine with the fuel.

7. The method of claim 1, wherein:
   the pressurized gaseous air or gaseous air components have a temperature of about 450° C. to about 650° C. at an inlet to the high pressure turbine; and
   combustion of the exhaust gas stream from the high pressure turbine with the fuel occurs at a pressure of about one atmosphere.

8. The method of claim 1, comprising:
   expanding through a combustion turbine a hot combustion gas mix formed by combusting the exhaust gas stream from the high pressure turbine with the fuel;
   producing electricity with a generator driven by the combustion turbine; and
   regasifying the pressurized liquid air or liquid air components by heat transfer from an exhaust gas stream from the combustion turbine.

9. The method of claim 8, wherein the exhaust gas stream from the high pressure turbine is exhausted from the high pressure turbine at a pressure of about 10 to about 25 atmospheres.

10. The method of claim 8, wherein the pressurized gaseous air or gaseous air components have a temperature of about 400° C. to about 650° C. at an inlet to the high pressure turbine, and the hot combustion gas mix formed by combusting the exhaust gas stream from the high pressure turbine has a temperature of about 1000° C. to about 1400° C. at an inlet to the combustion turbine.

11. The method of claim 8, comprising combusting uncombusted gaseous air or gaseous air components in the exhaust gas stream from the combustion turbine with additional fuel to heat the exhaust gas stream from the combustion turbine prior to regasifying the pressurized liquid air or liquid air components by heat transfer from the exhaust gas stream from the combustion turbine.

12. The method of claim 11, wherein combusting uncombusted gaseous air or gaseous air components in the exhaust gas stream from the combustion turbine with additional fuel to heat the exhaust gas stream from the combustion turbine occurs at about one atmospheric pressure.

13. The method of claim 11, comprising combusting a stream of ambient air with the uncombusted gaseous air or gaseous air components in the exhaust gas stream from the combustion turbine and the additional fuel.

14. The method of claim 8 comprising, before regasifying the pressurized liquid air or liquid air components by heat transfer from the exhaust gas stream from the combustion turbine, preheating the pressurized liquid air or liquid air components with heat captured by condensing water out of the exhaust gas stream from the combustion turbine.

15. The method of claim 8, comprising compressing the exhaust gas stream from the high pressure turbine prior to combusting the exhaust gas stream from the high pressure turbine with the fuel to form the hot combustion gas mix.

16. The method of claim 15, comprising mixing ambient air with the exhaust gas stream from the high pressure turbine prior to compressing the exhaust gas stream from the high pressure turbine.

17. The method of claim 15 comprising, before regasifying the pressurized liquid air or liquid air components by heat transfer from the exhaust gas stream from the combustion turbine, preheating the pressurized liquid air or liquid air components with heat captured by condensing water out of the exhaust gas stream from the combustion turbine.

18. The method of claim 8, comprising compressing ambient air and mixing it with the exhaust gas stream from the high pressure turbine prior to combusting the exhaust gas stream from the high pressure turbine with the fuel to form the hot combustion gas mix.

19. The method of claim 18, wherein the exhaust gas stream from the high pressure turbine is exhausted from the high pressure turbine at a pressure of about 10 to about 25 atmospheres.

20. The method of claim 18 comprising, before regasifying the pressurized liquid air or liquid air components by heat transfer from the exhaust gas stream from the combustion turbine, preheating the pressurized liquid air or liquid air components with heat captured by condensing water out of the exhaust gas stream from the combustion turbine.

* * * * *